United States Patent
Beukema et al.

(10) Patent No.: US 7,840,757 B2
(45) Date of Patent: Nov. 23, 2010

(54) METHOD AND APPARATUS FOR PROVIDING HIGH SPEED MEMORY FOR A PROCESSING UNIT

(75) Inventors: Bruce L. Beukema, Hayfield, MN (US); Russell D. Hoover, Rochester, MN (US); Jon K. Kriegel, Rochester, MN (US); Jamie R. Kuesel, Rochester, MN (US); Eric O. Mejdrich, Rochester, MN (US); Robert A. Shearer, Rochester, MN (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1450 days.

(21) Appl. No.: 10/901,600

(22) Filed: Jul. 29, 2004

(65) Prior Publication Data

US 2006/0026358 A1    Feb. 2, 2006

(51) Int. Cl.
*G06F 12/00* (2006.01)
(52) U.S. Cl. .............. 711/118; 711/105; 711/165
(58) Field of Classification Search ............ 711/118, 711/105, 165
See application file for complete search history.

(56) References Cited

U.S. PATENT DOCUMENTS

| | | | | |
|---|---|---|---|---|
| 4,459,663 A | * | 7/1984 | Dye | 705/29 |
| 5,042,003 A | * | 8/1991 | Belt et al. | 711/2 |
| 5,257,359 A | * | 10/1993 | Blasco et al. | 711/138 |
| 5,307,477 A | * | 4/1994 | Taylor et al. | 711/3 |
| 5,581,705 A | | 12/1996 | Passint et al. | |
| 5,841,973 A | | 11/1998 | Kessler et al. | |
| 6,124,868 A | | 9/2000 | Asaro et al. | |
| 6,363,438 B1 | | 3/2002 | Williams et al. | |
| 6,449,699 B2 | | 9/2002 | Franke et al. | |
| 6,690,379 B2 | * | 2/2004 | Margulis | 345/535 |
| 6,725,296 B2 | | 4/2004 | Craddock et al. | |
| 6,801,207 B1 | | 10/2004 | Tischler et al. | |
| 6,801,208 B2 | | 10/2004 | Keshava et al. | |
| 6,820,143 B2 | | 11/2004 | Day et al. | |
| 6,820,174 B2 | | 11/2004 | Vanderwiel | |
| 6,862,027 B2 | * | 3/2005 | Andrews et al. | 345/505 |
| 2004/0117592 A1 | | 6/2004 | Day et al. | |
| 2004/0162946 A1 | | 8/2004 | Day et al. | |
| 2004/0263519 A1 | | 12/2004 | Andrews et al. | |
| 2005/0273577 A1 | * | 12/2005 | Wilson et al. | 711/217 |

* cited by examiner

*Primary Examiner*—Stephen C Elmore
(74) *Attorney, Agent, or Firm*—Patterson & Sheridan LLP

(57) ABSTRACT

Computer systems with direct updating of cache (e.g., primary L1 cache) memories of a processor, such as a central processing unit (CPU) or graphics processing unit (GPU). Special addresses are reserved for high speed memory. Memory access requests involving these reserved addresses are routed directly to the high speed memory. Memory access requests not involving these reserved addresses are routed to memory external to the processor.

20 Claims, 3 Drawing Sheets

METHOD AND APPARATUS FOR PROVIDING HIGH SPEED MEMORY FOR A PROCESSING UNIT

FIELD OF THE INVENTION

This invention generally relates to memory systems. More specifically, this invention relates to using high speed memory to support quickly updating cache (e.g., L1 and/or L2) memory.

BACKGROUND OF THE INVENTION

Computer systems have been used for over 50 years to process digital information. Over that time, computers have developed into high speed devices that can process tremendous amount of information at high speeds and at low cost in a remarkable number of applications. However, new applications that demand even higher performance at lower cost continue to emerge.

One relatively recent application of computers is video graphics. Real-time rendering of graphical images is highly computationally intensive. To accomplish real-time rendering, special graphics processors handle large amounts of data at very high speed using sophisticated data structures and processing techniques. Input data for the graphics processors are usually produced using a CPU that interacts with different types of memories, a memory controller, and various input/output devices.

The different types of memory include main memory that stores an operating system that integrates the operations of the CPU and the graphics processor. The main memory can include memories, such as random access memory, to hold data retrieved from a mass storage device, such as a disk drive. Because video graphic systems must operate quickly, the different types of memory usually include a relatively small, high speed local cache memory, often referred to as an L1 cache, which can be directly accessed by a central processor core. An L1 cache is used to store data that should be immediately available to the central processor core. Because of the relatively small size of the L1 cache, a second cache memory, often referred to as an L2 cache, is also often used. An L2 cache memory, while not as fast as an L1 cache, is still relatively fast, is much larger, and can store recent computational results. In practice, when a central processor core requires data, it first checks its L1 cache, then it checks the L2 cache, and then, if not found, checks the main memory.

If the data is found in main memory, it is retrieved and stored in the L1 cache for use by the central processing core. When data stored in the L1 cache is modified in main memory by an external device or CPU that is not associated with the cache, the copy in the cache becomes invalid (or "stale") and must be invalidated. Therefore, if the data in memory is to be used (e.g. cached) again, it must subsequently be retrieved from main memory to obtain the updated data. Since it takes a relatively long time to retrieve data from main memory, frequent main memory accesses to reload data into the cache can dramatically reduce system performance.

Therefore, a method of speeding updates of cache memories (e.g., L1 or L2 cache memories) would be beneficial. Also beneficial would be a method and apparatus of directly storing new data into a cache without involving main memory.

SUMMARY OF THE INVENTION

The principles of the present invention provide for quickly updating cache memories (e.g., an L1 or L2 cache). Special addresses are reserved for high speed memory whose access time by a processor is significantly shorter than the access time to main memory. When new cache data at a reserved address is updated, it is written directly to the high speed memory (and any cached copy is invalidated). Similarly, when data at a reserved address is requested (e.g., for use by the processor), this data is retrieved directly from the high speed memory.

BRIEF DESCRIPTION OF THE DRAWINGS

The principles of the present invention can be readily understood by considering the following detailed description in conjunction with the accompanying drawings, in which.

DETAILED DESCRIPTION OF A PREFERRED EMBODIMENT

The principles of the present invention provide for quickly updating cache memories while avoiding lengthy accesses to main memory. As previously explained, updating data in a cache, such as an L1 cache memory, can take a relatively long period of time if that data is obtained from main memory. However, principles of the present invention provide for high speed memory located close to a processor that may be utilized for quick updates to cache memory.

An Exemplary System

Figure 1:
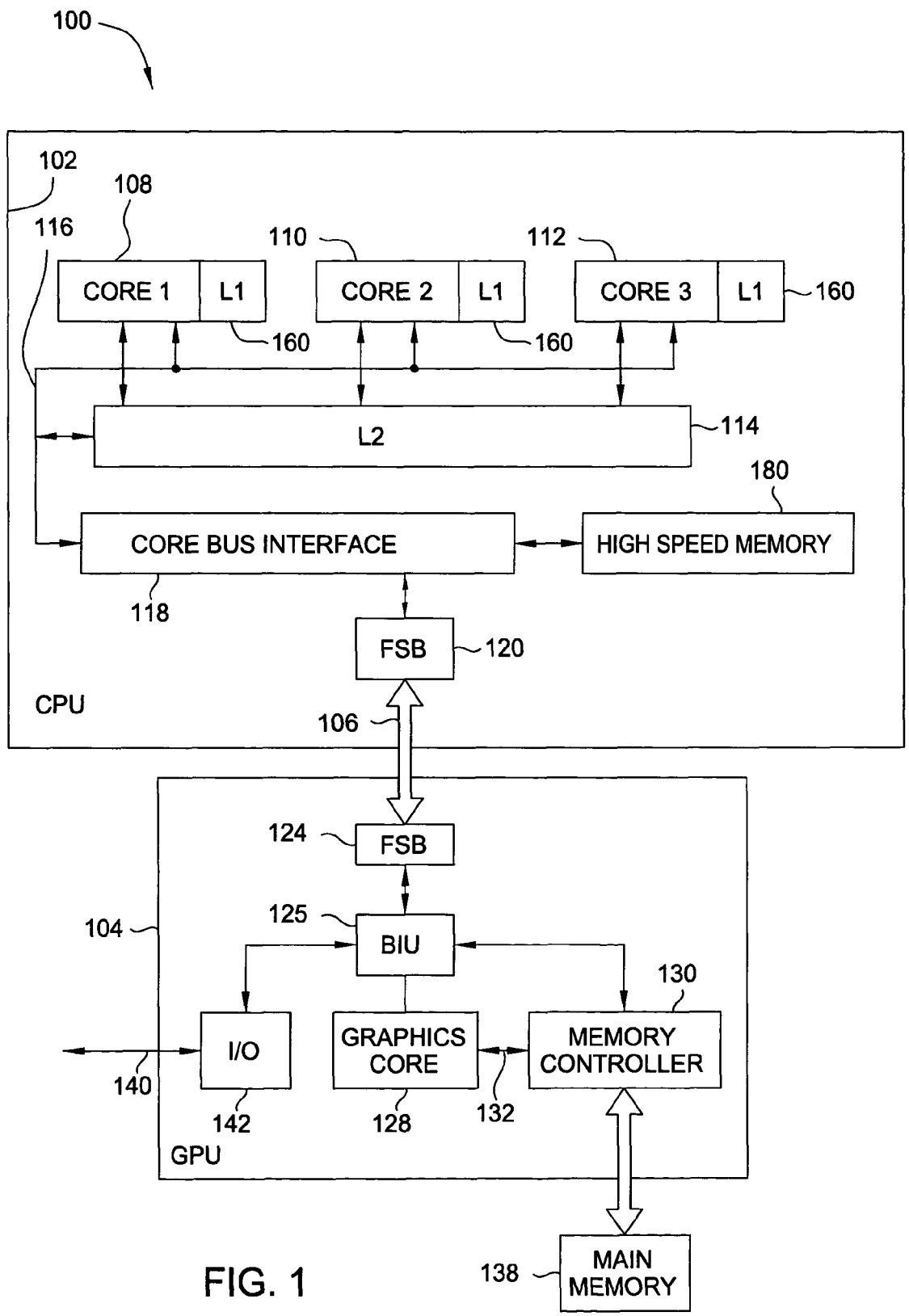
FIG. 1 schematically illustrates an exemplary video graphics system that incorporates principles of the present invention.

FIG. 1 schematically illustrates a system 100 in which L1 cache memory can be directly updated from high speed memory 180, thus reducing the update time. FIG. 1 illustrates a graphics system in which main memory 138 is near a graphics processing unit (GPU) and is accessed by a memory controller 130 which, for some embodiments, is integrated with (i.e., located on) the GPU. For other embodiments, the system 100 may include an external memory controller or a memory controller integrated with a central processing unit (CPU). In any case, it should be noted that the techniques described herein with reference to updating cache memories of a CPU may generally apply to updating cache memories of any type processor (e.g., a GPU).

As shown, the system 100 includes a CPU 102 and a GPU 104 that communicate via a bus 106. The CPU 102 illustratively includes a plurality of processor cores 108, 110, and 112 (also labeled as core 1, core 2, and core 3) that perform tasks under the control of software. Each individual core may have a corresponding L1 cache 160 and may communicate over a common bus 116 that connects to a core bus interface 118. For some embodiments, the individual cores may share an L2 (secondary) cache memory 114. The core bus interface 118 communicates with the L2 cache memory 114, and data into and out of the CPU 102 flows through the core bus interface 118, through a front-side bus interface 120, and through the bus 106.

The CPU 102 includes a high speed memory 180 that connects to the core bus interface 118. The high speed memory 180 is not a cache memory because it is directly accessible within the system 100 (e.g., by the processor cores 108-112 of the CPU 102 and the GPU 104 without requiring access to external main memory 138) and is itself cacheable. The high speed memory 180 is associated with a specially reserved range of addresses which, for some embodiments, may be configurable (e.g., via a control register). A write to one of the reserved addresses goes directly to the high speed memory 180, not to a main memory, as described in greater detail below. For some embodiments, the specially reserved addresses may comprise a range of addresses at least partially overlapping with (or "carved out of") a range of addresses used for main memory 138. For such embodiments, because accesses targeting the reserved address are routed to the high speed memory 180, as described herein, any overlapping portion of the reserved address range may be unused on the main memory 138.

The GPU 104 includes a graphics front-side bus interface 124 that connects to the bus 106 and that is used to pass information between the GPU 104 and the CPU 102. The GPU 104 is a high-performance video processing system that processes large amounts of data at very high speed using sophisticated data structures and processing techniques. To do so, the GPU 104 includes a graphics core 128 that processes data sent by a memory controller 130. The memory controller 130 connects to the graphics front-side bus interface 124 via a bus interface unit (BIU) 125. Data passes between the graphics core 128 and the memory controller 130 over a wide parallel bus 132. Connected to the memory controller 130 is a large main memory 138. The main memory 138 stores operating routines and application programs that implement the operation of the system 100 in accord with the principles of the present invention.

The GPU 104 also includes an I/O port 140 that connects to an I/O driver 142. The I/O driver 142 passes data to and from any number of external devices, such as a mouse, video joy stick, computer board, and display. The I/O driver 142 properly formats data and passes data to and from the graphic front-side bus interface 124. That data is then passed to or from the CPU 102 or is used in the GPU 104, possibly being stored in the main memory 138 by way of the memory controller 130. As illustrated, the graphics cores 128, memory controller 130, and I/O driver 142 may all communicate with the BIU 125 that provides access to the FSB via the GPU's FSB interface 124.

In some applications, data stored in the L2 cache is passed between the CPU 102 and the GPU 104 (for retrieval from or writing to the main memory 138) using a head pointer and tail pointer scheme. According to this scheme, the CPU 102 writes, to head pointers on the GPU 104, "end" addresses of data that has been updated and is ready to be read. In response, the GPU 104 may begin reading data from the L2 cache up to the address indicated by the head pointer. The GPU 104 may periodically write, to tail pointers on the CPU 102, the address up to which the GPU 104 has read, in effect, notifying the CPU 102 that it may update data up to this point (considering the tail pointers as circular). In other words, if the GPU 104 has read up to the address stored in the head pointer, it may write the same address back to the tail pointer on the CPU 102.

This process may continue as the CPU 102 and GPU 104 continue to process data. As the CPU 102 processes data, it may continually update a free-running pointer, that tracks a current address, as it processes data. It is the current address in this pointer that the CPU 102 finally writes to the head pointer of the GPU 104. Further, as the CPU places new data to be processed by the GPU in the cache, it will continually access (read) the tail pointers to determine how far (to what address) the GPU 104 has read to avoid overwriting locations the GPU 104 has not read yet.

Thus, tail pointers are one example of a type of data, updated frequently by the GPU 104 and accessed frequently by the CPU 102, that might be a candidate for utilization of the high speed memory 180. In other words, by keeping the rapidly changing and accessed tail pointers in the high speed memory 180, they may be rapidly cached (in L1) and rapidly updated without lengthy access to main memory 138.

Exemplary Operations Utilizing High Speed Memory

Figure 2:
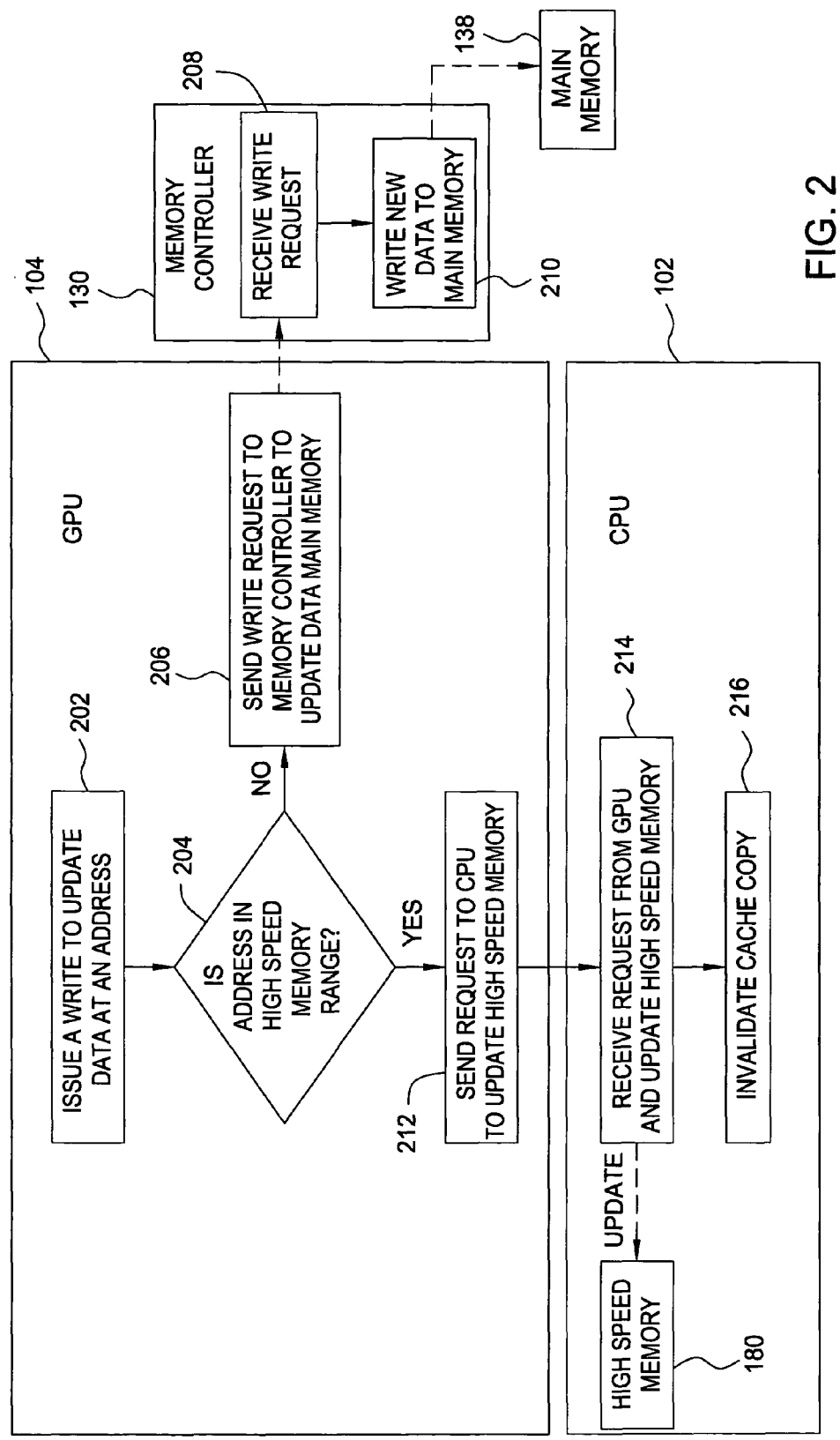
FIG. 2 illustrates a method of modifying cache data using high speed memory in accordance with principles of the present invention.

FIG. 2 illustrates exemplary operations 200 for rapidly modifying the contents of data in a cache, utilizing components shown in the system 100. The operations performed on the CPU side may be performed, for example, by control logic (not shown) built into the core bus interface 118, while operations on the GPU side may be performed by control logic (not shown) built into the GPU's bus interface unit (BIU) 125. As will become evident, such control logic may include any suitable circuitry to compare addresses of requests received to the range of addresses reserved for the high speed memory 180, and route those requests accordingly.

As shown, the operations 200 begin, at step 202, by issuing (e.g., from a graphics core of the GPU 104) a request to write data to a particular address. At step 204, a determination is made as to whether the address specified in the write request is one of those that are reserved for the high speed memory 180. If not, at step 206, the write data is sent to the memory controller 130 (in this example, shown external to the GPU 104), which receives the write request, at step 208. At step 210, the write data is written to main memory 138 by the memory controller.

On the other hand, if the write data is to be stored in one of the addresses reserved for the high speed memory 180, at step 212, the write data is sent to the CPU 102 to be stored in the high speed memory 180. For example, for some embodiments, tail pointers written to frequently by the GPU 102 may be mapped to the high speed memory 180. At step 214, the CPU 102 receives the request from the GPU 104 and updates the high speed memory 180. At step 216, the cache is notified to invalidate its copy of the data. While the cache copy is invalidated, as described below, data requested from this same address can be retrieved directly from high speed memory 180 and cached, thus avoiding lengthy retrieval from main memory.

Figure 3:
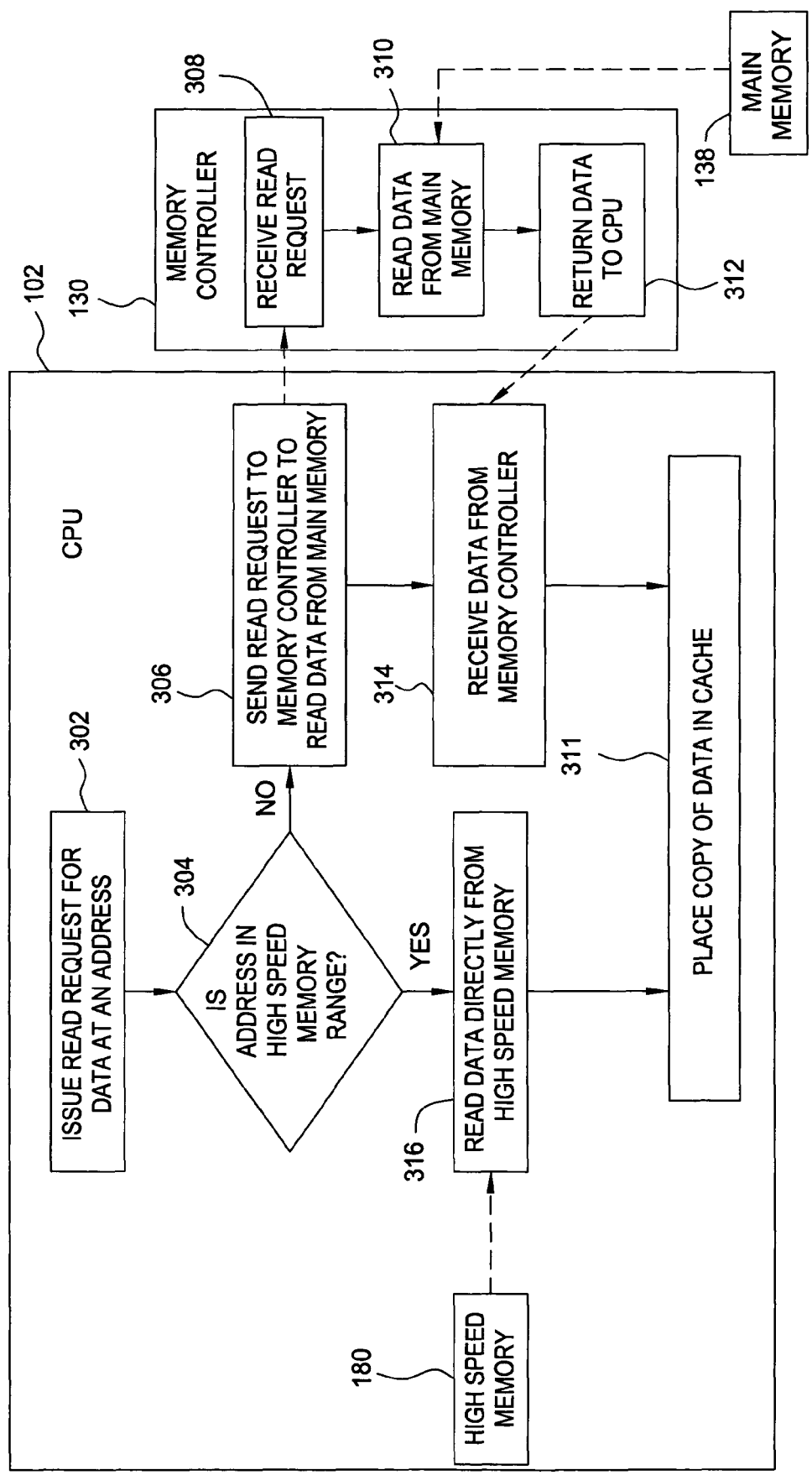
FIG. 3 illustrates a method of loading data into cache using high speed memory in accordance with principles of the present invention.

This is illustrated in FIG. 3, which illustrates exemplary operations 300 for rapidly updating the contents of data in a cache. The operations begin, at step 302, by issuing a read request, by the CPU 102, for data at an address. As previously, described, if this data is not in the cache (or the cached data has been previously marked as invalid), the data must be retrieved (i.e., loaded) from main memory 138 or high speed memory 180.

If the address of the read request is not in the high speed memory range (e.g., is one of the addresses reserved for high speed memory 180), as determined at step 304, the data must be loaded from main memory 138. Therefore, at step 306, the read request is sent to the memory controller 130, which receives the read request, at step 308. At step 310, the memory controller 130 reads the data from the main memory 138 and returns the data to the CPU 102, at step 314, which places a copy in the cache, at step 318.

On the other hand, if the address of the read request is in the high speed memory range, the data may be loaded directly from high speed memory 180, at step 316, and cached, at step 318. Thus, data stored in high speed memory 180 may be accessed rapidly and loaded into cache, without lengthy accesses to main memory 138.

CONCLUSION

By utilizing high speed memory with a reserved address space, cached data may be modified and loaded without accessing in memory. As a result, significant performance improvements may be achieved, particularly for applications that rapidly update data, such as head and tail pointers in memory accesses between a CPU and an external device.

Although the invention has been described with reference to preferred embodiments, workers skilled in the art will recognize that changes may be made in form and detail without departing from the spirit and scope of the invention. The embodiments shown in the figures are provided by way of example only.

What is claimed is:

1. A method for maintaining data accessible by a processor core of a central processing unit (CPU) in cacheable high speed memory internal to the CPU, comprising:
   reserving a predetermined range of memory addresses for the high speed memory internal to the CPU, wherein the high speed memory is not used as a cache for memory external to the CPU;
   routing memory access requests involving addresses that fall within the predetermined range to the high speed memory; and
   routing memory access requests involving addresses that do not fall within the predetermined range to memory external to the CPU.

2. The method of claim 1, wherein:
   routing memory access requests involving addresses that fall within the predetermined range to the high speed memory comprises routing at least one write request from a device external to the CPU to write data to the high speed memory; and
   the method further comprises invalidating a copy of the data stored in a cache internal to the CPU.

3. The method of claim 2, wherein:
   routing memory access requests involving addresses that fall within the predetermined range to the high speed memory comprises routing at least one read request to read data to the high speed memory; and
   placing a copy of the data in the cache.

4. The method of claim 1, further comprising specifying the predetermined range of memory addresses via a control register.

5. The method of claim 1, wherein routing memory access requests involving addresses that do not fall within the predetermined range to the memory external to the CPU comprises routing memory access requests to a memory controller external to the CPU.

6. A method for modifying data in a cache accessible by a processor core of a central processing unit (CPU), comprising:
   receiving a request to write updated data to an address;
   determining if the address falls within a range of address reserved for high speed memory internal to the CPU and accessible to the processor core, wherein the high speed memory is not used as a cache for memory external to the CPU; and
   if so, writing the data to the high speed memory and invalidating the address of the modified data from the cache.

7. The method of claim 6, further comprising writing the data to memory external to the CPU in response to determining the address falls outside the range of addresses reserved for the high speed memory.

8. The method of claim 7, wherein writing the data to memory external to the CPU comprises sending the write request to a memory controller external to the CPU.

9. The method of claim 8, wherein the memory controller is integrated with a graphics processing unit (GPU).

10. A method for loading data into a cache accessible by a processor core of a central processing unit (CPU), comprising:
    receiving a request to read data from an address;
    determining if the address falls within a range of address reserved for high speed memory internal to the CPU and accessible to the processor core, wherein the high speed memory is not used as a cache for memory external to the CPU; and
    if so, reading the data from the high speed memory.

11. The method of claim 10, further comprising reading the data from memory external to the CPU in response to determining the address falls outside the range of addresses reserved for the high speed memory.

12. The method of claim 7, wherein reading the data from memory external to the CPU comprises sending the read request to a memory controller.

13. The method of claim 12, wherein the memory controller is integrated with a graphics processing unit (GPU).

14. A processor comprising:
    at least one processing core having an associated primary cache;
    a set of high speed memory registers having a reserved set of addresses, wherein the high speed memory registers are not used as a cache for memory external to the processor; and
    control logic configured to route memory access requests involving addresses within the reserved set of address to the high speed memory and to route memory access requests involving addresses outside the reserved set of addresses to the memory external to the processor.

15. The processor of claim 14, further comprising a secondary cache.

16. The processor of claim 14, wherein the control logic is further configured to invalidate copies of data in the primary cache after writing data to the high speed memory.

17. The processor of claim 14, wherein the at least one processing core comprises a plurality of processing cores, each having an associated primary cache.

18. A system, comprising:
    main memory;
    a memory controller; and
    a central processing unit (CPU) having at least one processing core with an associated primary cache, a set of high speed memory registers, wherein the high speed memory registers are not used as a cache for the main memory, and control logic configured to route memory access requests involving addresses within a reserved set of addresses to the high speed memory and to route memory access requests involving addresses outside the reserved set of addresses to the memory controller to access the main memory, wherein the main memory is external to the CPU.

19. The system of claim 18, wherein the reserved set of addresses at least partially overlaps with a set of addresses of the memory external to the CPU.

20. The system of claim 18, further comprising a graphics processing unit (GPU), wherein the memory controller is integrated with the GPU.

* * * * *